May 25, 1948.  H. W. CHURCHILL  2,442,231
HUSKING MECHANISM
Original Filed April 22, 1944   4 Sheets-Sheet 1

Inventor
Howard W. Churchill,

By Clarence A. O'Brien
and Harvey B. Jacobson
Attorneys

Inventor
Howard W. Churchill,
By Clarence A. O'Brien
and Harvey B. Jacobson
Attorneys May 25, 1948.                H. W. CHURCHILL                2,442,231
                              HUSKING MECHANISM
              Original Filed April 22, 1944      4 Sheets-Sheet 4
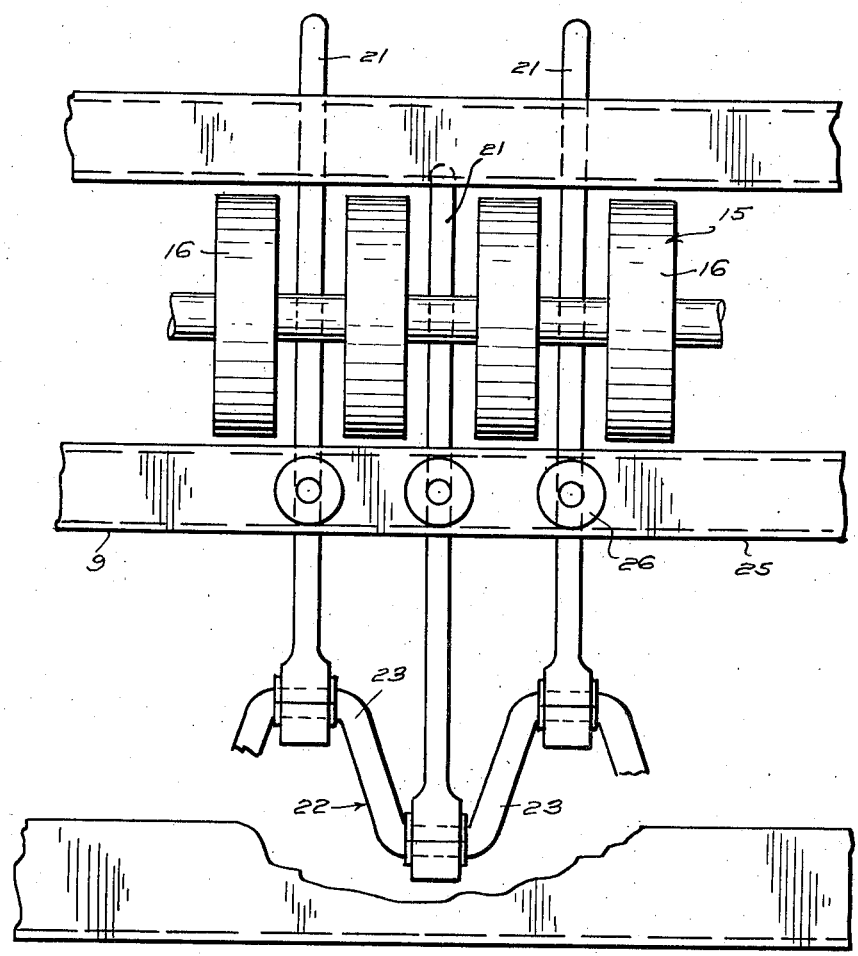
Fig. 4.
Fig. 5.
Inventor
Howard W. Churchill,
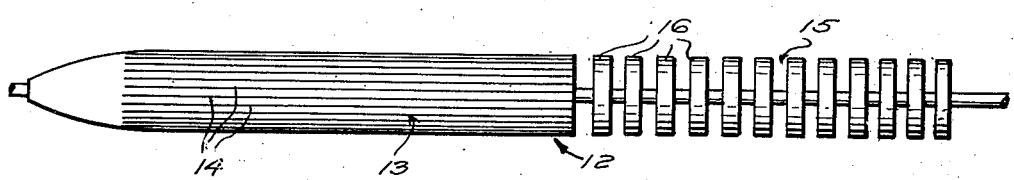
Attorneys Patented May 25, 1948

2,442,231

UNITED STATES PATENT OFFICE 2,442,231

HUSKING MECHANISM

Howard W. Churchill, Fairfield, Nebr.

Original application April 22, 1944, Serial No. 532,298. Divided and this application October 8, 1945, Serial No. 621,106

2 Claims. (Cl. 130—5)

This invention relates to husking mechanisms for corn harvesting machines, and the present application is a division of my copending application, Serial Number 532,298 filed April 22, 1944, for Corn harvesting machine.

The primary object of the present invention is to provide a husking mechanism which is highly efficient in operation, compact in construction, and otherwise adapted to meet the requirements for successful commercial use.

A more specific object of the invention is to provide husking mechanism comprising, in combination with the rear husking portions of combined stripping and husking rolls, vertically reciprocating husking hooks coacting with said husking portions of the rolls to remove the husks from the ears of corn as they are turned and conducted rearwardly.

The invention further contemplates the provision of simple and efficient means for guiding the husking hooks and for driving the latter.

The exact nature of the invention will become apparent from the following description when considered in connection with the accompanying drawings, and the invention consists in the novel form, combination and arrangement of parts hereinafter more fully described, shown in the drawings and claimed.

In the drawings:

Figure 4 is a fragmentary side elevation looking toward the left of Figure 3.

Figure 5 is a plan view of one of the combined stripping and husking rolls.

Figure 1:
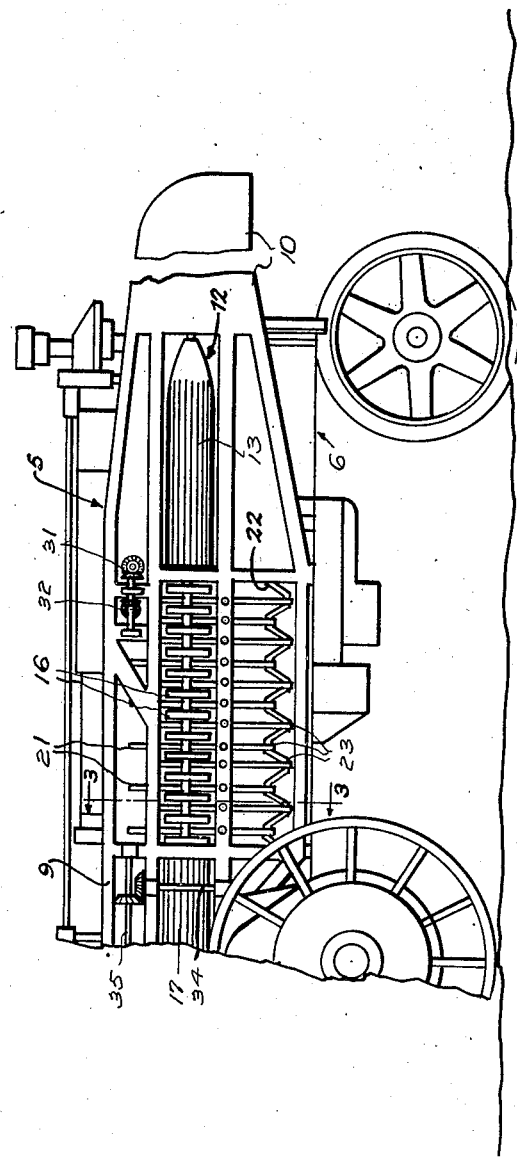
Figure 1 is a fragmentary side elevational view, showing the forward portion of a harvesting machine embodying husking mechanism constructed in accordance with the present invention.
Figure 2:
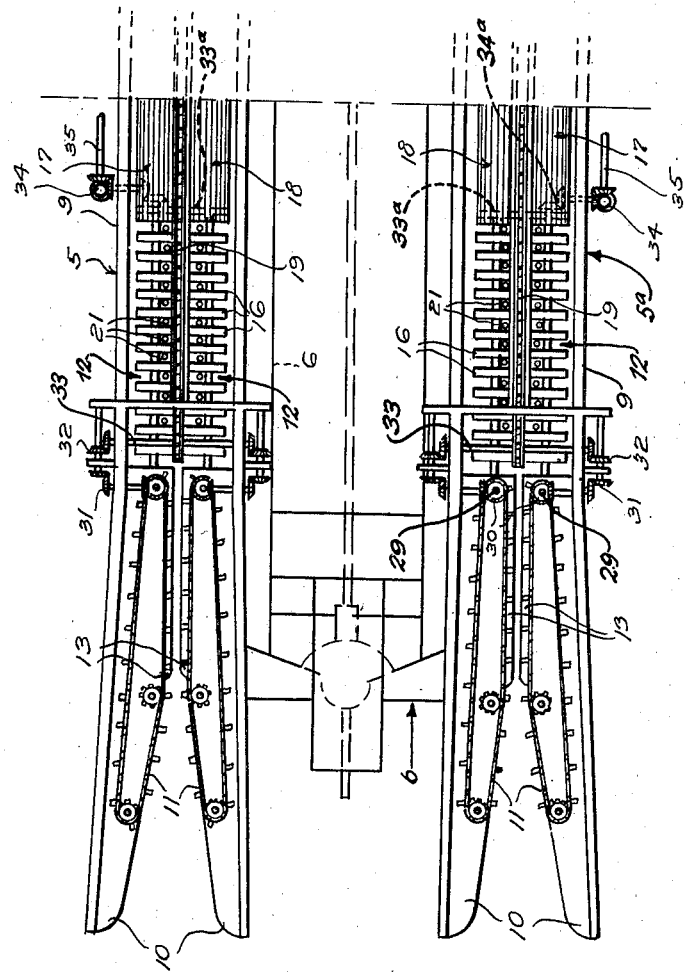
Figure 2 is a top plan view thereof, but with the machine turned to travel to the left rather than to the right as in Figure 1.

Referring in detail to the drawings, the present invention is illustrated as forming part of a corn harvesting machine in which two similar corn harvesting apparatus 5 and 5a are respectively mounted longitudinally of and upon opposite sides of a conventional agricultural tractor 6 as disclosed in my above mentioned copending application.

Each apparatus consists of a suitable elongated frame 9 mounted in any preferred or suitable manner longitudinally of and upon the tractor 6 at one side thereof and in a substantially horizontal position. The frame 9 is provided at its forward end with spaced gathering arms 10 whose inner edges diverge forwardly for reception of the standing stalks of corn therebetween. Mounted upon the gathering arms 10 are a pair of coacting substantially horizontal gathering chains 11, and journaled in the frame 9 longitudinally of the latter are a pair of coacting combined stripping and husking rolls 12 of the form shown more clearly in Figure 5. The rolls 12 have forward stripping portions 13 preferably provided with longitudinal ribs 14 of saw tooth formation, and rear husking portions 15 composed of a plurality of equally spaced disc sections 16. The stripping and husking rolls are mounted with their forward stripping portions 13 disposed directly beneath the major rear portions of the gathering chains 11. The gathering chains 11 conduct the stalks longitudinally into the stripping portions 13 of the rolls, where said portions 13 strip the stalks from the ears of corn and discharge said stalks downwardly onto the ground while delivering the ears of corn rearwardly onto the husking portions 15.

Mounted on the same shafts that carry the stripping and husking rolls and directly at the rear of the latter are simple secondary husking rolls 17 and 18, and mounted above and centrally between the two sets of rolls is a vertical chain conveyer 19 that extends above the rear husking portions 15 of the rolls 12 and above and rearwardly of the husking rolls 17 and 18.

Figure 3:
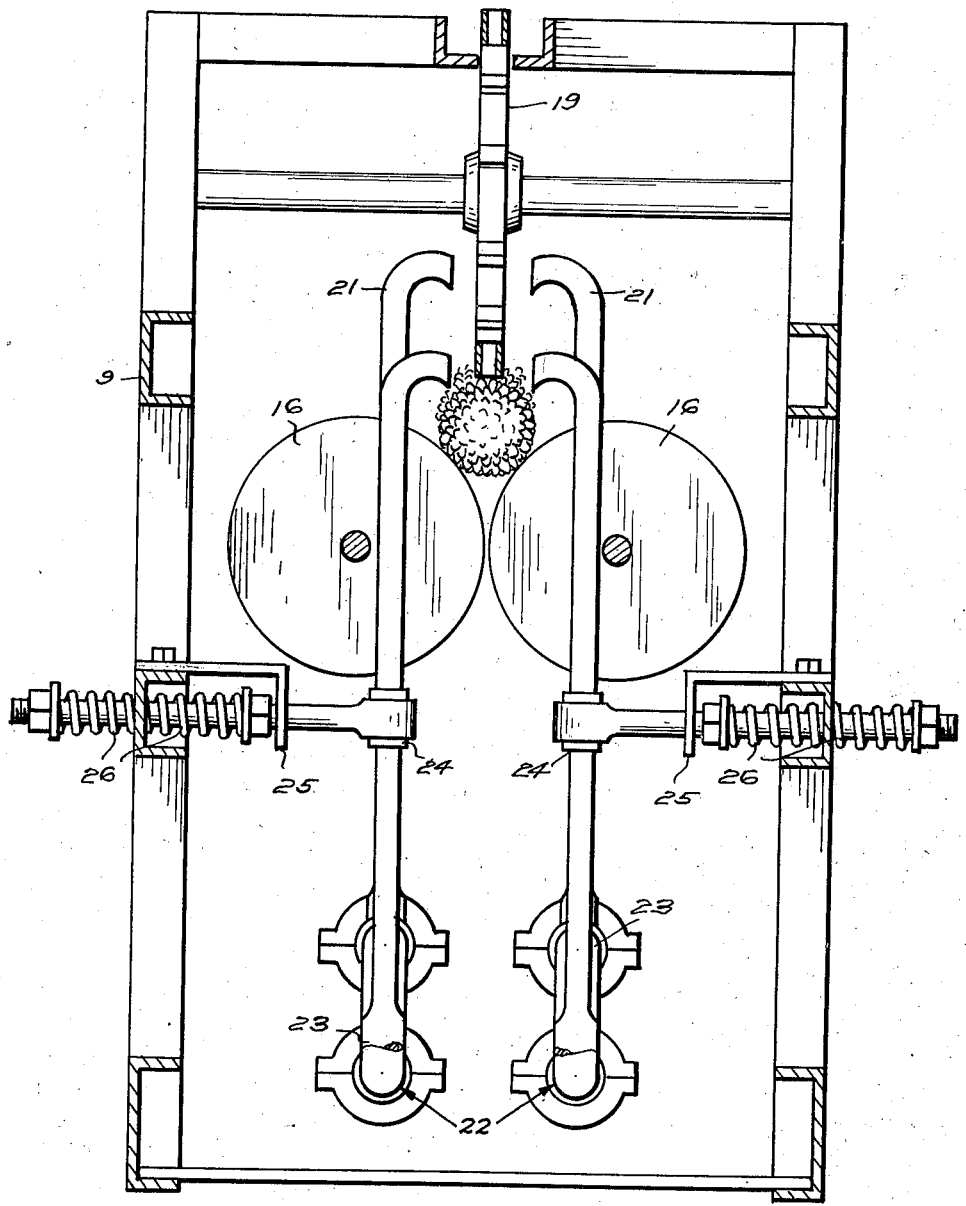
Figure 3 is an enlarged vertical transverse section through one of the husking mechanisms of the machine shown in Figures 1 and 2, taken on the line 3—3 of Figure 1.

In accordance with the present invention, two longitudinal series of vertically reciprocating husking hooks 21 are provided which cooperate with the rear husking portions 15 of the rolls 12. The hooks of one series face those of the other as shown clearly in Figure 3, and those of one series work in the spaces between the sections 16 of one roll 12, while those of the other series work in the spaces between the sections 16 of the other roll 12. Thus, the series of hooks 21 are disposed at opposite sides of the ears of corn as they are conveyed rearwardly by the conveyer 19 along the rear husking portions 15 of the rolls 12. Also, said hooks are so arranged and inturned at their upper hooked ends as to engage the husks on the ears of corn to loosen and pull the husks therefrom without having actual contact with the kernels of corn on the ears or damaging them. As the hooks 21 are rapidly reciprocated vertically and the ears of corn are conveyed rearwardly and rotated, the rear portions of the rolls 12 and the hooks 21 effectively remove the husk from the ears. However, a few portions of the husks will be missed now and then, and it is the function of the rolls 17 and 18 to complete the husking operation when this occurs or to remove any portions of husks that may remain when the ears of corn pass to the rolls 17 and 18. Thus, completed husked ears of corn are discharged from the rolls 17 and 18.

A pair of spaced longitudinal crank shafts 22 are journaled in the lower portion of frame 9 beneath the rear portions 15 of the rolls 12 and the lower ends of the husking hooks 21 are operatively connected to the cranks 23 of these crank shafts. The shanks of the hooks 21 slidably pass through suitable guides 24 that are mounted for yielding movement transversely of the frame 9 in either direction under the influence of springs 26. Thus, the hooks may yield laterally to insure efficient operation without damage to the mechanism, and they are yieldingly held inwardly in operative relation to the ears of corn being husked. The shafts 22 are preferably driven by suitable gearing from the rear or head shafts 29 of the gathering chains 11, and said head shafts 29 of the gathering chains are driven by gearings 30, 31 and 32 from the forward or foot shaft 33 of conveyer 19. It will be apparent that as the hooks 21 reciprocate vertically, they rapidly tear the husks loose from the ears of corn and coact with the rear portions 15 of the rolls 12 to remove the husks and discharge them downwardly onto the ground. The shafts 22 may also be driven at their rear ends to secure a more positive actuation thereof without undue strain. For this purpose, the rear ends of the shafts 22 are geared to each other as at 33a, and one of them is geared to a vertical shaft 34 as at 34a. Shaft 34 is geared to a horizontal longitudinal shaft 35 that may be driven from the shaft of roll 17. The shafts of rolls 17 and 18 may be intergeared and suitably driven from the power take-off shaft of the tractor, but these features, which are disclosed clearly in my above mentioned copending application, are not specifically illustrated herein as they form no specific part of the present invention.

In operation, the machine is driven forwardly with the body of the tractor located between adjacent standing rows of corn. As the machine moves forwardly, the standing corn in the rows will be received between the gathering arms 10 of the respective harvesting apparatus for being conducted rearwardly by the gathering chains 11. The stalks are then stripped from the ears of corn and the ears of corn are then husked by the means and in the manner previously described. The husked ears of corn are then delivered from the rolls 17 and 18 rearwardly for ultimate reception within a receptacle or wagon at the rear of the machine. The husking mechanism is of a novel and highly efficient character and is embodied in a very compact and efficient organization of mechanism arranged to affect a continuous harvesting operation. Minor changes in details of construction illustrated and described are contemplated, such as fall within the spirit and scope of the invention as claimed.

What I claim is:

1. In a corn harvesting machine, a pair of co-acting substantially horizontal husking rolls disposed in parallel relation and having a plurality of equally spaced disc sections, two spaced longitudinal series of vertically reciprocating husking hooks, each husking hook embodying an elongated straight shank having a hooked upper end, the hooked upper ends of one series of husking hooks facing those of the other series of husking hooks above said rolls, the shanks of the hooks of one series being arranged to work in the spaces between the disc sections of one roll and those of the other series being arranged to work in the spaces between the disc sections of the other roll, means for reciprocating each series of husking hooks including a crank shaft journaled beneath and parallel with the rolls and having cranks alternately extending in opposite directions and journaled in the lower ends of the associated hooks, and driving means for said crank shafts.

2. The construction defined in claim 1, in combination with guides for the shanks of said husking hooks slidably mounted below the rolls to move substantially horizontally transversely of said rolls, and yieldable means acting on said guides to yieldingly position the two series of hooks in predetermined spaced relation and to permit yielding of the hooks of each series away from those of the other series laterally of the rolls.

HOWARD W. CHURCHILL.

REFERENCES CITED

The following references are of record in the file of this patent:

UNITED STATES PATENTS

| Number | Name | Date |
|---|---|---|
| 735,308 | Snyder | Aug. 4, 1903 |
| 1,314,353 | Morral | Aug. 26, 1919 |
| 1,525,063 | Boyer | Feb. 3, 1925 |
| 1,600,212 | Berger | Sept. 21, 1926 |
| 2,202,540 | Stelter | May 28, 1940 |